(12) United States Patent
Loeffler

(10) Patent No.: US 10,139,839 B2
(45) Date of Patent: Nov. 27, 2018

(54) FLOW-CONTROL VALVE

(71) Applicant: Oventrop GmbH & Co. KG, Olsberg (DE)

(72) Inventor: Gerhard Loeffler, Olsberg (DE)

(73) Assignee: OVENTROP GMBH & CO. KG, Olsberg (DE)

( * ) Notice: Subject to any disclaimer, the term of this patent is extended or adjusted under 35 U.S.C. 154(b) by 272 days.

(21) Appl. No.: 14/901,433

(22) PCT Filed: Jul. 1, 2014

(86) PCT No.: PCT/DE2014/100223
§ 371 (c)(1),
(2) Date: Dec. 28, 2015

(87) PCT Pub. No.: WO2015/010685
PCT Pub. Date: Jan. 29, 2015

(65) Prior Publication Data
US 2016/0139606 A1    May 19, 2016

(30) Foreign Application Priority Data

Jul. 22, 2013  (DE) .................. 10 2013 107 762
Mar. 7, 2014   (DE) .................. 10 2014 103 051
(Continued)

(51) Int. Cl.
G05D 7/01      (2006.01)
F16K 1/44      (2006.01)
(Continued)

(52) U.S. Cl.
CPC ............. *G05D 7/01* (2013.01); *F16K 1/443* (2013.01); *F16K 1/526* (2013.01);
(Continued)

(58) Field of Classification Search
CPC ... F16K 1/02; F16K 1/04; F16K 1/443; F16K 1/526; Y10T 137/7788; Y10T 137/7791;
(Continued)

(56) References Cited

U.S. PATENT DOCUMENTS 1,467,464 A * 9/1923 Wesson .................... F16K 1/02
                                                              251/276
1,502,650 A * 7/1924 Ashe ........................ F16K 1/02
                                                              137/315.4
(Continued)

FOREIGN PATENT DOCUMENTS

DE           10256035 B      9/2004
DE      102007013505 A     10/2008
(Continued)

*Primary Examiner* — William McCalister
(74) *Attorney, Agent, or Firm* — Andrew Wilford

(57) ABSTRACT

The invention relates to a flow regulating valve (1) for liquid-conducting heating or cooling systems, consisting of a housing (2) with an inlet (3), an outlet (4), and a connecting piece (13) which is arranged between the inlet and outlet and into which a pressure regulating device (14) that keeps the pressure difference between the pressure regions in front of and behind a flow regulating unit (8) arranged in the connecting piece constant and a spindle (7) with an actuating part protruding out of the housing (2) and with a first throttle element (9) located in the housing (2) are inserted, said first throttle element acting on the flow regulating unit or parts thereof. The flow regulating unit (8) consists of a first throttle device, which is made of the first throttle element (9) that is secured to the spindle (7) and a seat (10), and a second throttle device, which is made of a second throttle element (11) that is arranged on the spindle (7) in a movable manner along same and a seat, wherein the second throttle element (11) can be moved in the direction of the first throttle element (9).

7 Claims, 5 Drawing Sheets

(30) Foreign Application Priority Data

Apr. 4, 2014 (DE) .................. 10 2014 004 907
Apr. 4, 2014 (DE) .................. 10 2014 004 910

(51) Int. Cl.
*F16K 1/52* (2006.01)
*F24D 19/10* (2006.01)

(52) U.S. Cl.
CPC ....... *F24D 19/1036* (2013.01); *G05D 7/0106* (2013.01); *Y10T 137/7788* (2015.04)

(58) Field of Classification Search
CPC ......... Y10T 137/7864; Y10T 137/7865; Y10T 137/7939; F24D 19/1036; G05D 7/01; G05D 7/0106
USPC ......... 137/501, 503, 516.21, 516.23, 543.23; 251/322
See application file for complete search history.

(56) References Cited

U.S. PATENT DOCUMENTS

| | | | | |
|---|---|---|---|---|
| 1,507,874 A * | 9/1924 | Waterman | F16K 1/02 | 251/217 |
| 1,563,590 A * | 12/1925 | Rottel | F16K 1/02 | 192/82 P |
| 1,631,564 A * | 6/1927 | Raalte | F16K 1/04 | 251/216 |
| 1,674,074 A * | 6/1928 | Turner | F16K 1/02 | 251/217 |
| 1,678,927 A * | 7/1928 | Weatherhead, Jr. | F16K 1/04 | 251/351 |
| 1,821,422 A * | 9/1931 | Corey | F16K 1/02 | 251/211 |
| 2,029,202 A * | 1/1936 | Shepherd | F16K 1/02 | 137/244 |
| 2,211,068 A * | 8/1940 | McDonald | B03B 5/623 | 137/206 |
| 2,339,421 A * | 1/1944 | Newell | F16K 31/163 | 137/102 |
| 2,374,690 A * | 5/1945 | Laue | F16K 1/02 | 251/227 |
| 2,377,227 A * | 5/1945 | Griswold | F16K 31/385 | 137/489.5 |
| 2,403,689 A * | 7/1946 | Sprague | F16K 17/30 | 137/498 |
| 2,414,911 A * | 1/1947 | Temple | F16K 1/04 | 137/318 |
| 2,473,704 A * | 6/1949 | Garretson | F16K 1/04 | 251/149.5 |
| 2,474,430 A * | 6/1949 | Laue | F16K 1/02 | 251/216 |
| 2,623,331 A * | 12/1952 | Greening | G05D 16/0663 | 137/498 |
| 2,655,946 A * | 10/1953 | Morris | F16K 1/04 | 138/99 |
| 2,916,047 A * | 12/1959 | Butcher | G05D 7/0106 | 137/501 |
| 3,532,104 A * | 10/1970 | Hoen | F15B 13/0417 | 137/115.1 |
| 3,948,481 A * | 4/1976 | Pollock | F01P 11/0276 | 137/351 |
| 4,071,011 A * | 1/1978 | Oertle | B01J 3/03 | 137/317 |
| 4,418,888 A * | 12/1983 | Jacobson | F16K 1/04 | 137/315.27 |
| 4,703,776 A * | 11/1987 | Rumney | F16K 1/54 | 137/625.3 |
| 5,642,752 A * | 7/1997 | Yokota | G05D 7/0106 | 137/413 |
| 5,775,369 A * | 7/1998 | Hagmann | G05D 7/0106 | 137/501 |
| 6,062,257 A * | 5/2000 | Wild | F24D 19/1015 | 137/501 |
| 6,062,540 A * | 5/2000 | Hubler | F16K 1/04 | 251/216 |
| 7,681,589 B2 * | 3/2010 | Schwegman | F16K 15/063 | 137/15.17 |
| 8,469,052 B2 | 6/2013 | Jorgensen | | |
| 8,763,632 B2 * | 7/2014 | Loeffler | G05D 7/005 | 137/497 |
| 2011/0042603 A1 * | 2/2011 | Loeffler | F16K 1/443 | 251/324 |
| 2011/0068284 A1 * | 3/2011 | Jorgensen | G05D 7/0106 | 251/46 |
| 2013/0081723 A1 * | 4/2013 | Koury | F16K 1/04 | 137/597 |
| 2013/0299017 A1 * | 11/2013 | Evans | F16K 37/0016 | 137/553 |
| 2014/0283930 A1 * | 9/2014 | Colby | F16K 1/54 | 137/556 |
| 2016/0139606 A1 * | 5/2016 | Loeffler | F16K 1/443 | 137/455 |

FOREIGN PATENT DOCUMENTS

DE 102007050454 B 5/2009
DE 102011107273 A 1/2013

* cited by examiner

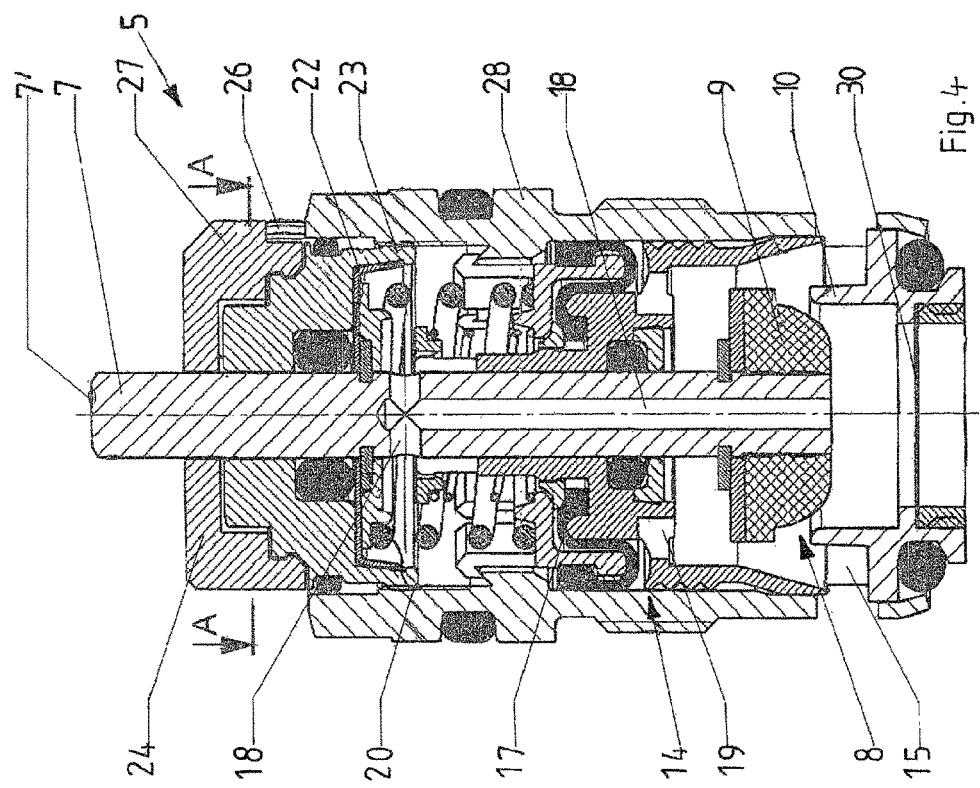
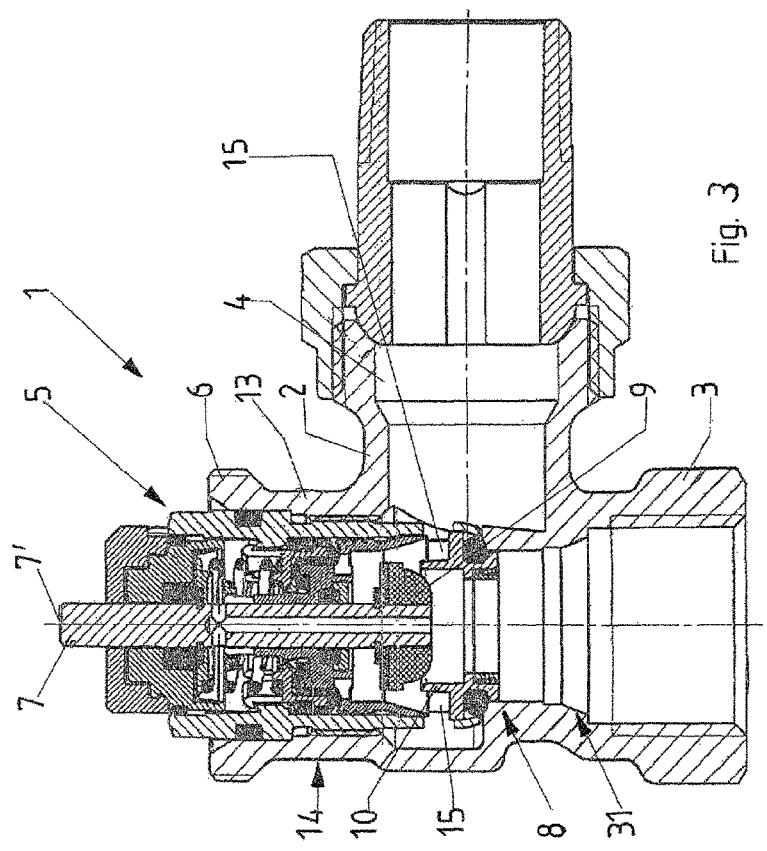

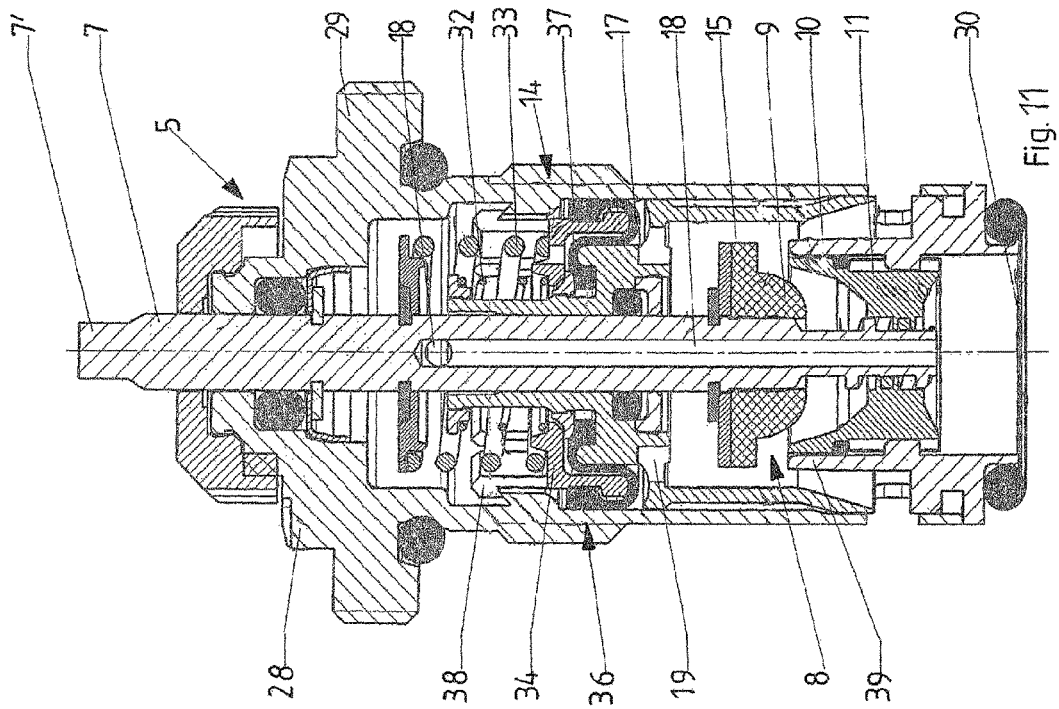
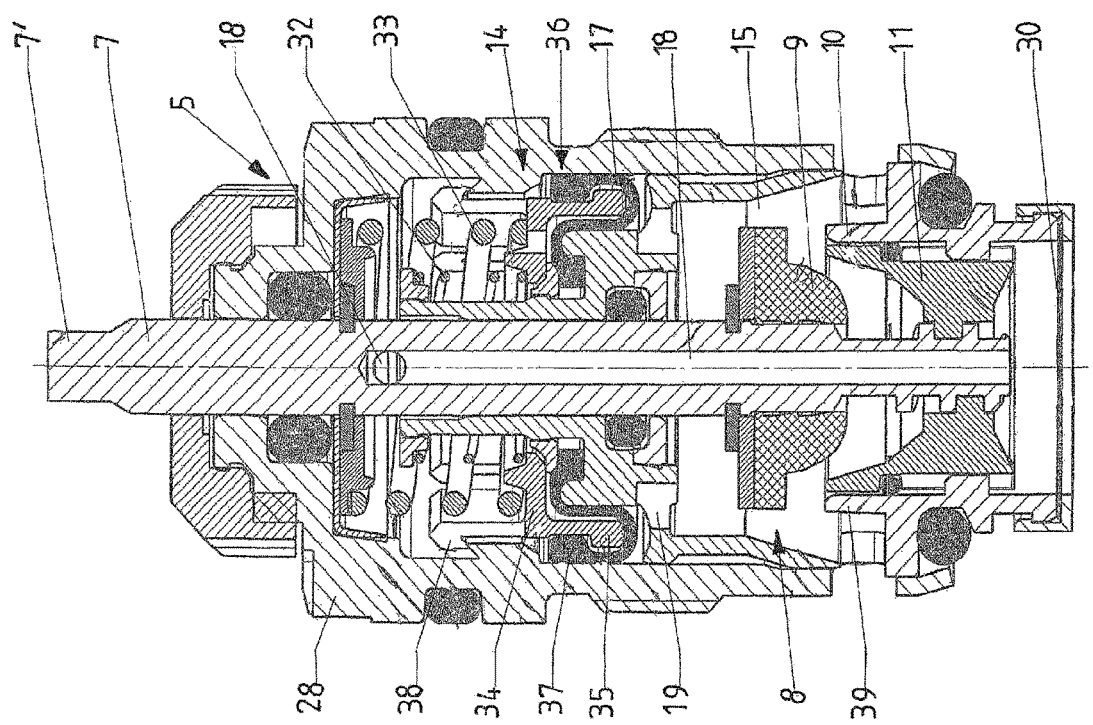

FLOW-CONTROL VALVE

CROSS REFERENCE TO RELATED APPLICATIONS

This application is the US-national stage of PCT application PCT/DE2014/100223 filed 1 Jul. 2014 and claiming the priority of German patent application 102013107762.5 itself filed 22 Jul. 2013, German patent application 102014103051.6 itself filed 7 Mar. 2014, German patent application 102014004907.8 itself filed 4 Apr. 2014, and German patent application 102014004910.8 itself filed 4 Apr. 2014.

The invention relates to a flow-control valve for liquid-conducting heating or cooling systems, consisting of a housing with at least one inlet port and at least one outlet port and a connection fitting therebetween into which is inserted a pressure-control assembly that maintains constant a pressure differential between the pressure upstream of and downstream of a flow-control assembly in the connection fitting, as well as a spindle with actuating element projecting out of the housing and a first valve body in the housing that acts on the flow-control assembly or on parts thereof.

In particular, the invention relates to a dynamically operating flow-control that can regulate flow such that it remains constant through the entire valve independently of the differential pressure.

For example, a valve combination for controlling the throughput quantity and/or differential pressure in liquid-conducting heating or cooling systems is known from PCT/DE 2008/000669 [U.S. Pat. No. 8,763,632] in which, downstream of the inlet port in the direction of flow of the flowing medium, an upstream valve is followed by an intermediate valve, then a downstream valve and finally the outlet port.

The known valve combination is expensive to manufacture because its prefabricated parts must be built into the housing. Not only does this result in high manufacturing costs, but the housing must also be relatively large. It is also disadvantageous that the known embodiments cannot easily be combined with commercially available thermostat valves, millions of which are currently being used.

In order to achieve a hydraulic balance in a fluid-conducting heating or cooling system, it is advantageous to install a valve with an integrated pressure-control assembly for the individual consumers. Since the majority of valves in existing systems are installed without such an integrated pressure-control assembly, the complete replacement of such a conventional valve with a valve with an integrated pressure-control assembly has been necessary up to now.

Valves with integrated pressure control for regulating a fluid stream flowing through the valve are known from DE 102 56 035 and from WO 2009/135490 [U.S. Pat. No. 8,469,052]. Here, a preset cross section can be changed by two parts that can be moved relative each other, thus limiting the fluid stream to a maximum value. However, this type of presetting requires additional chamber in the valve. In existing, commercially available thermostat valve housings that are constructed without an integrated pressure-control assembly, such additional chamber is not available. In these solutions, a new housing adapted to the corresponding components is therefore needed and installed.

Embodiments of presettable flow-control valves are known from DE 10 2007 050 454, particularly from FIGS. 3 and 4 in which the pressure-control assembly is a separate component beneath the valve body and associated seat. Here, too, additional chamber is required. And with these embodiments as well, installation in existing, commercially available thermostat valve housings without an integrated pressure-control assembly is not possible. It is therefore necessary in those cases as well to use a completely new housing that is adapted to hold the components.

In addition, valves with integrated pressure control for regulating a fluid stream flowing through the valve are known from DE 102 56 035 and from WO 2009/135490 [U.S. Pat. No. 8,469,052] in which the set-point spring is in the flow passage of the fluid stream. Moreover, a valve spring is on the spindle of these valves. In these solutions, a new housing adapted to the special valve core is required. Moreover, the set-point spring is in the flow passage of the fluid stream in these solutions, which narrows the cross section of the flow passage on the one hand and influences the flow in the flow passage on the other hand through the formation of eddies, which has a disruptive effect, particularly in the case of larger volumetric flows. A similar arrangement is also known from DE 10 2007 050 454.

Starting from this prior art, it is the object of the invention to provide a flow-control valve with integrated pressure control that is of simple construction, is inexpensive to manufacture, takes up as little space as possible, and offers the possibility of equipping existing thermostat valves with an embodiment of the flow-control valve in which the existing non-dynamic valve cores are replaced by a valve according to the invention.

To achieve this object, the invention proposes that the flow-control assembly be composed of a first valve subassembly formed from a first valve body attached to the spindle and a seat, and of a second valve subassembly formed from a second valve body displaceable along the spindle and a seat, the second valve body being displaceable toward and away from the first valve body such that a cross section of the flow passage can be changed by the flow-control valve.

According to this embodiment, the flow-control assembly is very compact and has all of the necessary components. It is therefore a stand-alone flow-control assembly that can be installed into an appropriate housing. Especially preferably, in this regard the first valve body forms the seat of the second valve body.

One very special embodiment makes a provision that all parts, namely the pressure-control assembly, the valve spindle with first valve body, the flow-control assembly with first valve subassembly and second valve subassembly together with second valve body and the associated seats for the valve bodies, form a valve core that is a single part that can be installed into or removed from the connection fitting of the housing as one piece, the individual parts being captively interconnected.

Particularly as a result of this measure, it is possible to equip the housing with such a valve core that contains all of the elements of pressure control and throughput regulation. This valve core is a single part that can be installed into or removed from the corresponding housing in its entirety. This also makes it possible to retrofit existing, commercially available thermostatic valves having non-dynamic valve cores with such a dynamic valve core by changing out the existing valve core for the valve core according to the invention.

In the embodiment according to the invention, a servo drive that can be attached to the housing can be on the actuating element of the valve spindle projecting from the housing and can serve for adjustment of the first valve subassembly. By means of the servo drive, the valve spindle is moved axially counter to a spring provided in the valve core or housing from a maximum open position to a partially or completely closed position.

In order to also enable easy adjustment of the second valve subassembly, a provision is made that die spindle preferably has a handle that is non-rotationally mounted on its end and projects from the housing or the valve core for adjusting the second valve subassembly, the second valve body being coupled with the spindle via a screwthread and the second valve body being non-rotationally held or guided on the valve core or seat for the first valve body so as to be axially displaceable of the spindle.

The handle is mounted detachably on the spindle.

It can also be preferred that the handle be of polygonal shape and form a drive formation for an adjustment tool. In order to indicate to the user the position that he has actually set by adjustment, the handle is provided with first markings for the set position and a pointer corresponding thereto is on the housing or on the valve core. One preferred embodiment of the pressure-control assembly is that the pressure-control assembly has a diaphragm clamped in a chamber of the valve core whose one face turned toward the actuating element of the spindle communicates openly with the inlet port via a first passage formed in the spindle and whose face turned toward away from the flow-control assembly communicates with the flow-control assembly via a second passage.

With this embodiment, the pressure differential between the input and output pressures upstream of and downstream of the flow-control assembly is simply maintained constant.

Moreover, in order to achieve the object described above, the valve core that can be or is inserted into the connection fitting has a diaphragm-controlled pressure-control assembly integrated therein that surrounds the spindle coaxially and can be displaced on same that maintains constant a pressure differential between the input and output pressures upstream of and downstream of the flow-control assembly integrated into the valve core formed by the valve seat and the valve body, the spindle integrated into the valve core having an actuating element projecting out of the housing and out of the valve core and the valve body attached thereto, and that the presetting of the flow-control assembly is done by adjustable stroke limiters of the valve body. According to this embodiment, the flow-control assembly of the flow-control valve is very compact and has all of the necessary components. It is therefore a self-contained flow-control assembly that can be built into an appropriate housing, that is, particularly also into a housing that previously held non-dynamic valve cores which can be replaced by the flow-control valve according to the invention.

With this embodiment, the valves can therefore be built into an existing, commercially available thermostat valve housing, a very low insertion depth into the thermostat valve housing being achieved as a result of the predetermined compact outer dimensions, so that the pipe connections of the existing housing are not covered by the valve core, and this solution enables the component to be installed into or removed from a thermostat valve housing as one piece.

According to the invention, the flow-control assembly is formed substantially from a valve seat and a valve body, the presetting of the flow-control assembly being achieved by limiting the stroke of the valve body so that the fluid stream can be limited to a maximum value that corresponds to the axial stroke of the valve body. In addition, the pressure-control assembly engages coaxially around the spindle coupled with the valve body and is axially displaceable on same, thus forming a compact unit that can also be mounted as a single part into existing, commercially available thermostat valve housings and removed therefrom as such.

Especially preferably, the pressure-control assembly and the flow-control assembly, together with the stroke limiters, are captively interconnected into a single part as components of the valve core, so that the valve core can be installed into or removed from the housing as a complete installation unit.

As a result, both the compact structure and the manageability are further promoted.

In one preferred development of the stroke limitation, a provision is made that the spindle has at least one collar or recess projecting radially that corresponds to a stop on an adjustment ring held on the valve core so as to be displaceable relative to the valve core and comes to rest on a stop in an end position.

In addition, a provision is made here that the axially displaceable adjustment ring engages coaxially around the spindle.

In addition, a provision is also made that the adjustment ring has a screwthread that complementarily interfits with a screwthread of the valve core thereby converting rotation of the adjustment ring into axial displacement. In particular, the adjustment ring is provided with a handwheel coupled therewith in a rotationally fixed manner having a dial with value indicia that cooperate with a pointer fixed on the valve core.

Finally, rotational movement of the handwheel is limited by a stop provided on the handwheel that corresponds to the pointer.

Through these features, excellent handling for the adjustment of the stroke of the valve body is achieved in whole or in part, thus making it simple to adjust the stroke limiters.

To enable and facilitate the arrangement of an actuator that actuates the spindle, that is, move in the axial direction, the valve core has a housing having a connection formation for the attachment of an actuator that acts on the actuating element of the spindle.

In order to maintain the interior of the core free of contamination, the valve seat of the valve core has a filter screen.

In addition, the filter screen is detachably attached to the valve core or components thereof. To produce a conventional flow-control valve in which installation of the necessary elements into existing, commercially available thermostat valve housings can be done while enabling a maximally large volumetric flow to flow through the flow-control valve despite the compact outer dimensions prescribed by same, and while ensuring that, despite the installation of the corresponding parts, the interior of the valve housing remains open in the region of the pipe connection geometries, i.e. it is not covered by installed elements, it is proposed that a valve core be arranged that can be or is inserted into the connection fitting, with a diaphragm-controlled pressure-control assembly integrated therein that engages coaxially around the spindle and can be displaced on same to maintain constant a pressure differential between the input and output pressures upstream of and downstream of the flow-control assembly integrated into the valve core formed by the valve seat and the valve bodies, the spindle integrated into the valve core having an actuating element projecting out of the housing and out of the valve core and the valve body attached thereto, that a set-point spring of the pressure-control assembly be on the side of the diaphragms turned away from the flow passage or gap and the face turned toward the actuating element of the spindle, and that a valve spring engages coaxially around the set-point spring.

According to the invention, in order to achieve hydraulic balance in a fluid-conducting heating or cooling system, a valve with am integrated pressure-control assembly for the individual consumers is installed. Since the majority of valves in the existing systems are installed without integrated pressure-control assembly, it is advantageous in the case of such valves if, according to the invention, only the valve core is exchanged for a valve core with integrated pressure-control assembly. This is possible even under system pressure using cutoffs, for example. Hydraulic balance is thus made possible in existing systems with little expense. What is more, due to the fact that the set-point spring is on the side of the diaphragms turned away from the flow passage and coaxially between the valve spring and the actuating spindle, a maximally large volumetric flow is made available despite the compact outer dimensions, and flow is not impaired by the set-point spring.

Especially preferably, the pressure-control assembly and the flow-control assembly, together with the valve spring and set-point spring, are captively interconnected into a single part as components of the valve core so that the valve core can be installed into or removed from the housing as a complete installation unit.

As a result, both the compact structure and the manageability are promoted.

In addition, preferably both the set-point spring and the valve spring are supported on a common retaining element in the valve core. In this way as well, the compact structure is promoted, which enables installation into existing housings.

The retaining element also has a shape that supports the diaphragms and forms a chamber for the outer sealing bead of the diaphragms.

In addition, the retaining element has a nonpositive or form-fitting connection to the valve core housing.

The valve core or the valve core housing can be provided with a connection formation for attachment of an actuator that acts on the actuating element of the valve spindle.

In addition, the seat of the valve core has a collar.

One especially preferred development makes a provision that a presettable second valve body is in the seat of the valve core beneath the first valve body.

The presettability of the throughput is thus achieved in a simple manner without enlarging the installation size of the valve core.

In order to prevent contamination, the seat of the valve core has a filter screen. This filter screen is arranged so as to be replaceable.

Embodiments of the invention are shown in the drawing and described in further detail below.

FIG. 3 is a longitudinal section through a flow-control valve according to the invention with integrated pressure control in the assembled state viewed in a central section;

FIG. 4 is another longitudinal section through a valve core according to the invention with large preset value;

FIG. 10 is another longitudinal section through a valve core according to the invention with separate presetting element;

FIG. 11 is a view of a variant of a valve core with separate presetting element and connection geometries for attaching a servo drive that can act on the spindle.

Figure 2:
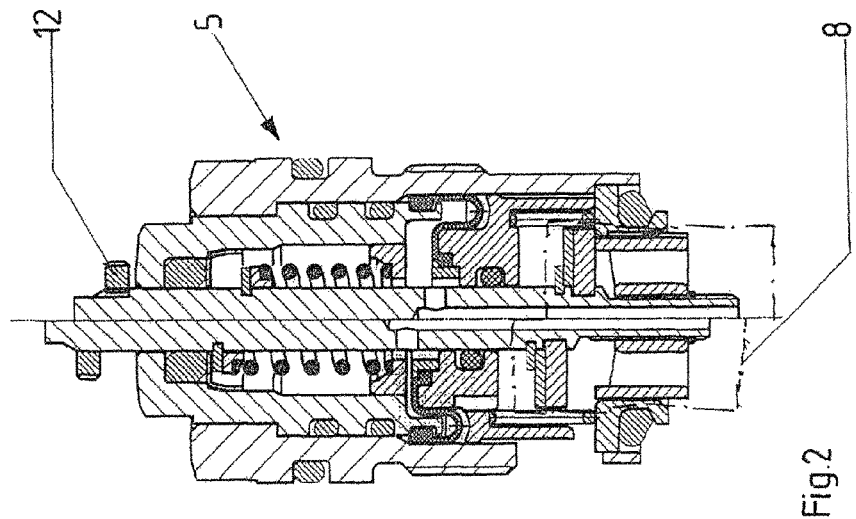
FIG. 2 is a longitudinal section through the valve core of FIG. 1 without housing, also in two different stroke positions.

The drawing shows a flow-control valve 1 for liquid-conducting heating or cooling systems. It consists of a single- or multi-part housing 2 having an inlet port 3 and an outlet port 4 in the illustrated embodiment. A connection fitting 13 is provided between the inlet port 3 and outlet port 4 to which a pressure-control assembly 14 is fitted that maintains the pressure differential constant between the input and output pressures upstream of and downstream of a flow-control assembly 8 in the housing 2. Moreover, a valve spindle 7 having an actuating element projects upward out of the housing 2. A servo drive can be mounted on a connection formation 6 of the housing 2. The servo drive acts on the upper end of the spindle 7 and thus on the flow-control assembly 8 or parts thereof. As a result, the cross section of a valve flow passage is changed by this valve and its valve core as described further below. The pressure-control assembly 14 surrounds the spindle 7 coaxially and is axially displaceable thereon. The spindle 7 carries on its lower end a first valve body 9 that controls flow and that forms part of a first valve subassembly. In particular, the flow-control assembly 8 consists of this first valve subassembly with the valve body 9 attached to the spindle 7 and a seat 10 associated therewith. Furthermore, the flow-control assembly 8 consists of a second valve subassembly that is formed by a second valve body 11 on the spindle 7 so as to be displaceable along same and a seat associated therewith. The second valve body 11 can be displaced axially toward and away from the first valve body 9. As a result, the cross section of the flow passage can be changed by the flow-control valve 1.

Figure 1:
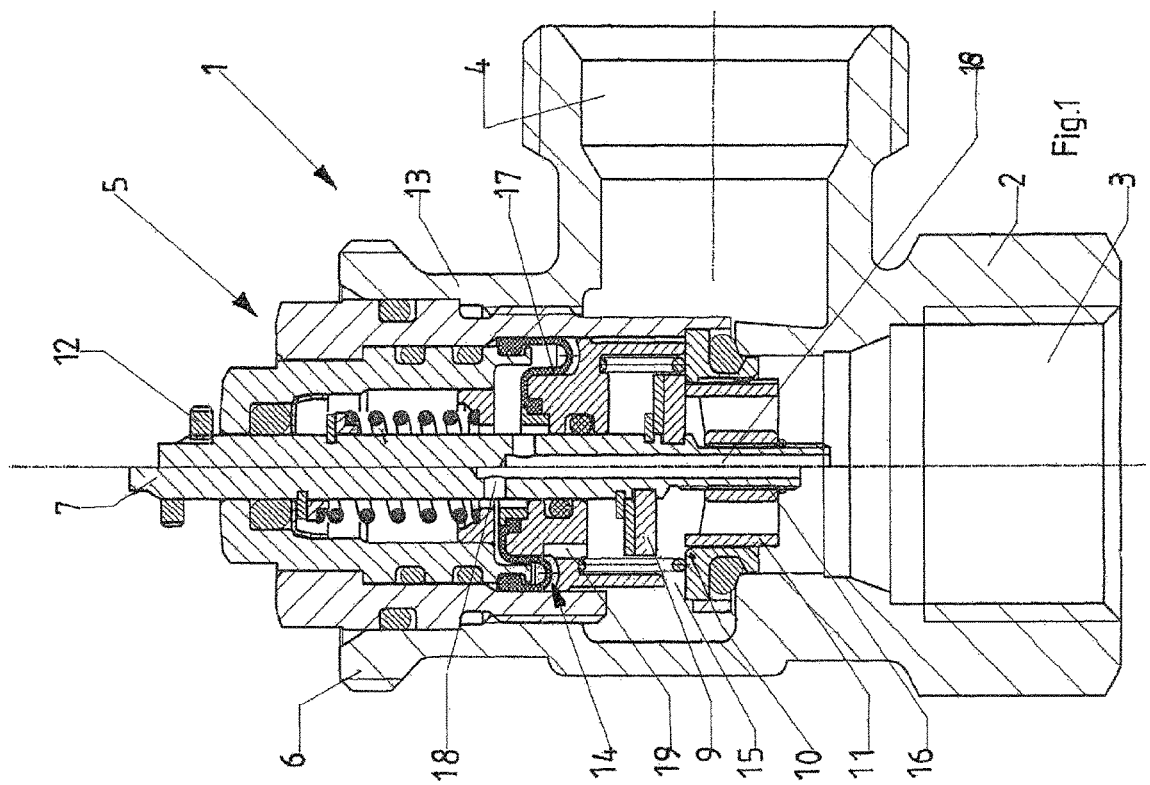
FIG. 1 is a longitudinal section through a flow-control valve according to the invention with integrated pressure control in the assembled state viewed in two different positions.

In particular, the first valve body 9 simultaneously forms the seat for the second valve body 11. For example, in a position is shown to the right in FIG. 1, the upper edge of the second valve body 11 rests in a sealing manner against the lower face of the first valve body 9. The drawing shows on the left that the second valve body 11 is spaced from the first valve body 9, thus enabling flow through a gap 15 toward the outlet port 4.

As also particularly shown in FIG. 2, all of the parts, namely the pressure-control assembly 14, the valve spindle 7 with its first valve body 9, the flow-control assembly 8 with the first valve subassembly and the second valve subassembly together with the second valve body 11 and the associated seats for the valve bodies form the valve core 5 or assembly that can be inserted and mounted as a whole into the connection fitting 13 of the housing 2.

The individual parts are captively interconnected. This embodiment also makes it possible, among other things, to make modify a commercially available thermostat valve with a non-dynamic valve core by replacing the existing valve core with the valve core 5 according to the invention.

On its end projecting at the top out of the housing 2 or the connector 13 or the valve core 5, the spindle 7 can carry a rotationally fixed handle for adjusting the second valve subassembly. To this end, the second valve body 11 is coupled with the spindle 7 via a screwthread 16. In addition, the second valve body 11 is held and guided on a part of the valve core 5 or the seat 10 for the first valve body 9 so as to be displaceable only axially, parallel to the longitudinal extension of the spindle. It is thus possible to displace the second valve body 11 axially of the spindle by rotation of the spindle 7 with the handle 12.

Preferably, the handle 12 is detachable from the spindle 7. It is also preferred that the handle 12 be of polygonal shape and thus form a drive formation for an adjustment tool, for example a wrench.

In addition, the handle 12 is provided with first markings for the set position and that a second marking corresponding thereto is provided on the housing 2 or preferably on the valve core 5. The user is thus easily able to precisely adjust and read out the preset values.

The pressure-control assembly 14 is of known construction. To this end a diaphragm 17 clamped in a groove of the valve core 5 has a face turned axially upward toward the actuating element of the spindle 7 and exposed to the pressure at the inlet port 3 via a first passage 18 extending through the spindle 7. Its face turned toward the flow-control assembly 8 is exposed to outlet pressure via a second passage 19 that opens toward the flow-control assembly 8. In this way, the pressure control is integrated in a simple manner into the design of the valve core 5.

The invention is a flow-control valve 1 that makes it possible, with the valve core 5 with all functional components, to cost-effectively produce such parts with small dimensions. In particular, such valve cores 5 can also be exchanged for conventional valve cores in conventional thermostat valves.

The drawing, particularly in FIGS. 3 to 8, shows a flow-control valve 1 for hot-water heating or cooling systems. It consists substantially of a single- or multi-part housing 2 having an inlet port 3 and an outlet port 4. A connection fitting 13 is provided between the inlet port 3 and the outlet port 4 into which a pressure-control assembly 14 is installed that maintains constant a pressure differential between the input and output pressures upstream of and downstream of a flow-control assembly 8 in the housing 2. Moreover, a valve spindle 7 has an actuating element 7' projecting upward from the housing 2. A servo drive can be mounted on the housing 2 that has a connection 6 for mounting such a servo drive. The servo drive acts on the upper end 7' of the spindle 7 and thus on the flow-control assembly 8 or parts thereof. The cross section of the flow passage is thus changed by the valve or valve core described further below.

The spindle carries on its lower end a first valve body 9 by means of which the flow is determined. The flow-control assembly 8 thus consists of a valve with the valve body 9 attached to the spindle 7 and a seat 10 associated therewith. With the seat 10, the valve body 9 forms a spacing gap 15 that is open toward the outlet port 4, thus enabling controlled throughput through the valve.

Figure 6:
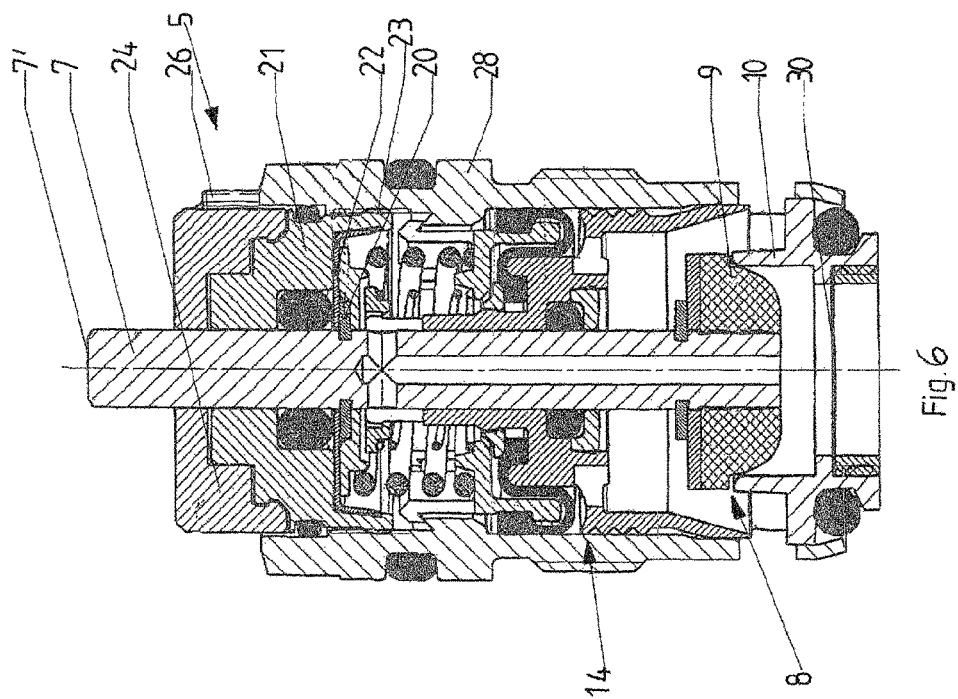
FIG. 6 is another longitudinal section through the valve core according to FIG. 4 with a small preset value.
Figure 5:
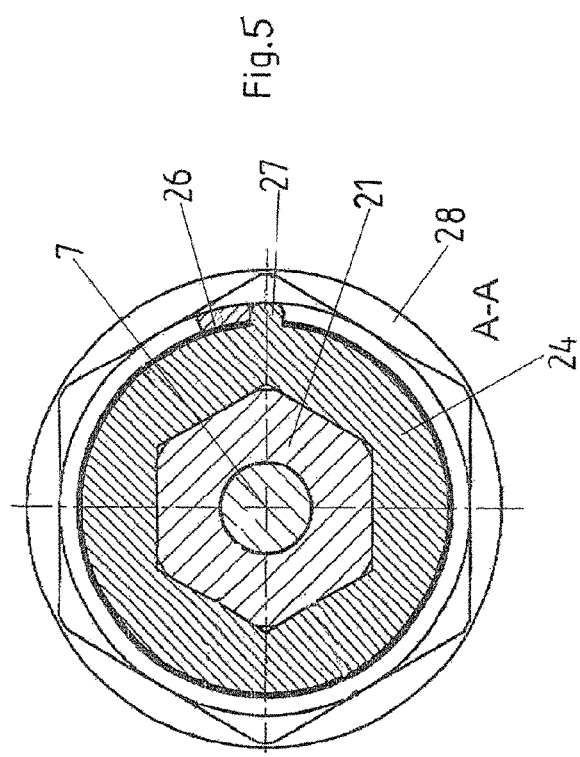
FIG. 5 is a section taken along line A-A of FIG. 4 with a handwheel mounted in a rotationally fixed manner on the adjustment ring and a stop thereon with a pointer cooperating with indicia.
Figure 7:
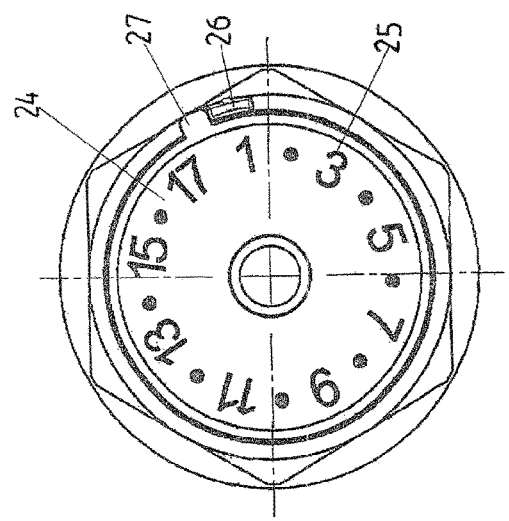
FIG. 7 is a top view of the valve core seen from above.
Figure 8:
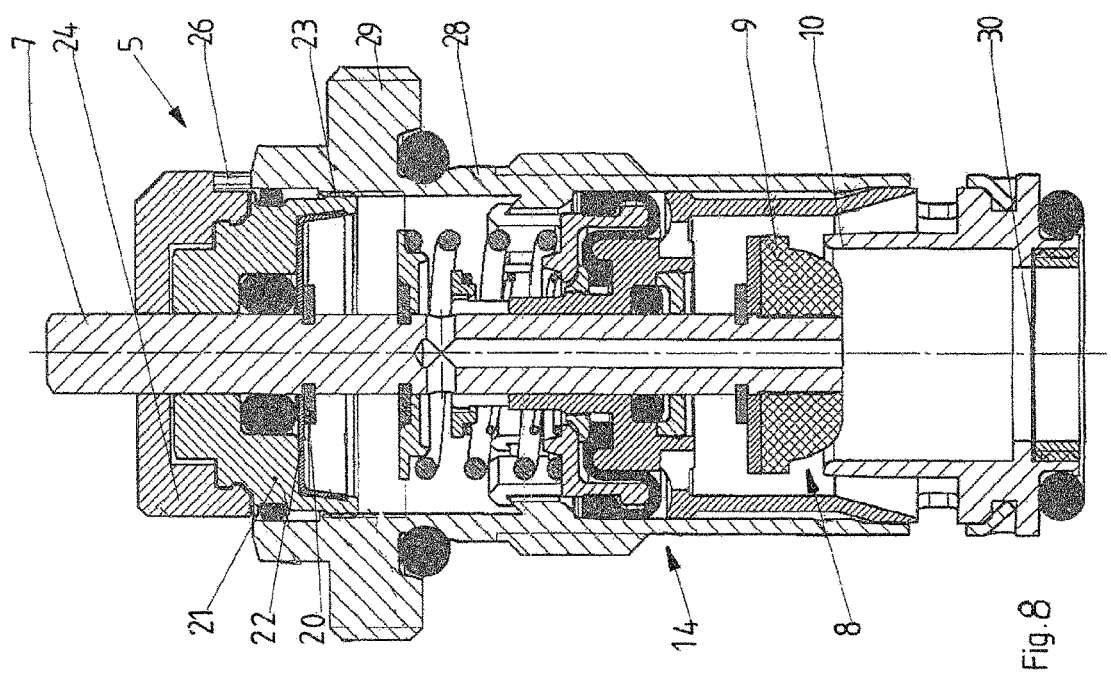
FIG. 8 is a view like FIG. 4 of a valve core with separate presetting element and connection geometries for attaching a servo drive.

As shown particularly by FIGS. 4, 6 and 8, all parts, namely the pressure-control assembly 14, the spindle 7 with the valve body 9 and the flow-control assembly 8 with the seat 10, are part of a valve core 5 or assembly unit that, as such, can be inserted and installed completely into the connection fitting 13 of the housing 2 as a complete unit. The individual parts are captively interconnected. This embodiment makes it possible, among other things, to perform an exchange in commercially available thermostat valves with non-dynamic valve cores in which the existing valve core is exchanged for a valve core according to the invention. The presetting of the flow-control assembly 8, which can be performed using adjustable stroke limiting means of the valve body 9, is integrated into this valve core 5.

The pressure-control assembly 14 of known construction. A diaphragm 17 is a clamped in a chamber of the valve core 5 and has a face turned toward the actuating element of the spindle 7 (at the top in the drawing) and that is exposed to the pressure of the inlet port 3 via a first passage 18 formed in the spindle 7. Its face turned toward the flow-control assembly 8 is connected via a second passage 19 that is open toward the flow-control assembly 8. Thus pressure control is integrated in a simple manner into the design of the valve core 5.

The valve core 5 has especially compact outer dimensions and thus a maximally shallow insertion depth into the housing 2 of the thermostat valve, so that the pipe connections 13 of the housing 2 are not covered by the valve core 5 when the valve core 5 is installed into or removed from the housing as one piece.

As a result of the stroke limitation of the valve body 9, the flow-control assembly 8 can be preset in that the fluid stream can be limited to a maximum value that corresponds to the preset lift height of the valve body 9.

The pressure-control assembly 14 coaxially surrounds the spindle coupled with the valve body 9 and is axially displaceable thereon, thus resulting, in turn, in a compact, mountable unit.

For the purpose of stroke limitation, the spindle 7 has at least one radially projecting collar 20 or recess that can come to rest against a stop 22 mounted on an axially displaceable adjustment ring 21. The axially displaceable adjustment ring 21 engages coaxially around the spindle 7. In addition, the adjustment ring 21 is provided in the illustrated embodiment with a screwthread 23 that converts rotation into axial displacement. Moreover, the adjustment ring 21 is provided with a handwheel 24 to which it is rotationally fixed. This handwheel 24 has a dial 25 for reading preset values of a pointer 26 mounted on the valve core 5. The rotation of the handwheel 24 is limited by a stop 27 that is formed on the handwheel 24 and cooperates with the pointer 26. In addition, as shown in FIG. 8, a valve core housing 28 can be provided with a connection formation 29 for the attachment of an actuator that acts on the actuating element 7' of the spindle 7.

For the purpose of stroke limitation, the corresponding elements can, as shown in the figures, be set in a position according to FIG. 4, for example that defines a large preset value and thus a large stroke of the valve body 9 or, as shown in FIG. 6, the stroke limitation can be set appropriately in order to form a small preset value. It is also possible, as shown in FIG. 8, for the valve core 5 to be provided with separate presetting element and connections 29 for attaching a servo drive.

In addition, in order to prevent contamination that might impair the function of the valve core 5, a filter screen 30 is provided beneath the valve seat 10 of the valve core 5 that is optionally arranged so as to be detachably attached, i.e. exchangeable.

Particularly as a result of the formation of the stroke limiters for the stroke of the valve body, an especially compact construction of the valve core 5 results, thus enabling such a valve core 5 to be exchanged for conventional valve cores in conventional thermostat valves.

Figure 9:
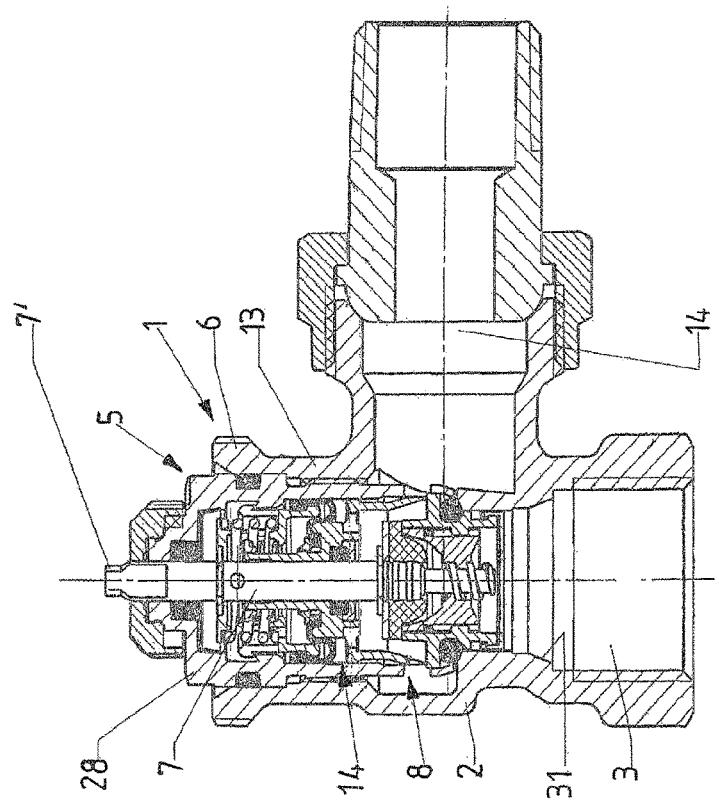
FIG. 9 is a longitudinal section through a flow-control valve according to the invention with integrated pressure control in the assembled state.

The drawing (FIGS. 9 to 11) shows a flow-control valve 1 for liquid-conducting heating or cooling systems. It consists of a single- or multi-part housing 2 that, in the illustrated embodiment, has an inlet port 3 and an outlet port 4. A connection fitting 13 is provided between inlet port 3 and outlet port 4 into which a pressure-control assembly 14 is installed that maintains constant a pressure differential between the input and output pressures upstream of and downstream of a flow-control assembly 8 in the housing 2. Moreover, a valve spindle 7 has an actuating element 7' projecting upward out of the housing 2. A servo drive can be mounted on the housing 2 that for example has a connection option 6 for connecting such a servo drive. Such a servo drive acts on the upper end of the spindle 7 and thus on the flow-control assembly 8 or parts thereof. The cross section of the flow passage is thus changed by the valve or by the valve core described further below.

The spindle 7 carries a first valve body 9 on its lower end as a component of a first valve subassembly that determines the flow. In particular, the flow-control assembly 8 consists of a first valve subassembly with the first valve body 9 attached to the spindle 7 and a seat 10 associated therewith. Furthermore, the flow-control assembly consists of a second valve subassembly that consists of a second valve body 11 in an axially displaceable manner in a collar 39, the second valve body 11 being associated with the valve body 9. The cross section of the flow gap 15 can be changed as a function of the setting of the second valve body 11 relative to the first valve body 9.

All parts, namely the pressure-control assembly 14, the valve spindle 7 with its valve body 9, the flow-control assembly 8 with the first valve subassembly and the second valve subassembly together with the second valve body 11 and the associated seats for the valve bodies, are parts of an assembly valve unit 5 that can be completely inserted and installed as one piece in the connection fitting 13 of the housing 2 as one piece or also removed. The individual parts are captively interconnected. This embodiment makes it possible, among other things, to perform an exchange for commercially available thermostat valves with non-dynamic valve cores by changing out the existing valve core for the valve core 5 of the invention.

The pressure-control assembly 14 integrated in the valve core 5 is of standard construction. To this end a diaphragm 17 is clamped manner in a chamber of the valve core 5 and has a face turned toward the actuating element of the spindle 7 (at the top in the drawing) and communicating with the inlet port 3 via a first passage 18 formed in the spindle 7. Its face turned toward the flow-control assembly 8 communicates via a second passage 19 opens toward the flow-control assembly 8. In this way, the pressure control is integrated in a simple manner into the design of the valve core 5.

Moreover, a set-point spring 32 of the pressure-control assembly 14 bears on the face of the diaphragm turned away from the flow passage or gap 15 and the face turned toward the actuating element 7' of the spindle 7. Moreover, a valve spring 33 is arranged that coaxially engages around the set-point spring 32. In this way, the chamber for both springs is kept small, so that the compact construction of the valve core 5 is achieved, and the installation thereof into existing valve housings of the abovementioned type is made possible.

In particular, the pressure-control assembly 14 and the flow-control assembly 8 together with valve spring 33 and set-point spring 32 are thus captively interconnected as a component of the valve core 5 to form a single part so that the valve core 5 can be installed in the housing 2 or removed from same as a complete installation unit.

In the illustrated embodiment, both the set-point spring 32 and the valve spring 33 are supported on a common retaining element 34 in the valve core 5 to promote the compact construction. This retaining element 34 also has a formation 35 that supports the diaphragm 17 and forms a chamber 36 for an outer sealing bead 37 of the diaphragms 17. The retaining element 34 is connected to the valve core housing 28 by a non-positive or form-fitting connection 38. In the illustrated embodiment according to FIG. 11, the valve core 5 and the valve core housing 28 have a connection fitting 29 for the attachment of an actuator that can act on the actuating element 7' of the valve spindle 7.

In addition, the seat 10 of the valve core 5 has a collar 39. A presettable second valve body 11 is in this collar beneath the first valve body 9. The second valve body 11 can be axially displaced in an appropriate manner, for example by rotating the spindle 7 coupled with the valve body 11.

In addition, the seat 10 of the valve core 5 is equipped on its lower face with a filter screen 30 that is preferably arranged so as to be exchangeable. The invention is not limited to the illustrated embodiments, but rather can be varied in a multitude of ways within the scope of the disclosure. All of the individual and combined features disclosed in the description and/or drawing are regarded as being essential to the invention.

List of Reference Symbols 1 flow-control valve
2 housing
3 inlet port
4 outlet port
5 valve core
6 connection option (for servo drive)
7 spindle
7' spindle end
8 flow-control assembly
9 first valve body
10 seat for 9
11 second valve body
12 handle
13 connection fitting
14 pressure-control assembly
15 gap
16 screwthread
17 diaphragm
18 first passage
19 second passage
20 collar
21 adjustment ring
22 stop
23 screwthread
24 handwheel
25 dial
26 pointer
27 stop for 26
28 valve core housing
29 connection formation
30 filter screen
31 pipe connection formation
32 set-point field
33 valve spring
34 retaining element
35 contour

The invention claimed is:

1. A flow-control valve for liquid-conducting heating or cooling systems, the flow-control valve comprising:
a housing having an inlet port, an outlet port, and a connection fitting therebetween;
a flow-control assembly in the connection fitting of the housing between the inlet port and the outlet port;
a pressure-control assembly in the housing that maintains constant a pressure differential between the input and output pressures upstream of and downstream of the flow-control assembly in the connection fitting;
a spindle with an actuating element projecting out of the housing;
a first valve subassembly in the flow-control assembly having a first seat on the housing and a first valve body in the housing fixed on the spindle, engageable with the first seat, and acting on the flow-control assembly or on parts thereof; and
a second valve subassembly in the flow control assembly and formed from a second valve body on the spindle so as to be displaceable therealong and a second seat for the second valve body and formed in the first valve body, the second valve body being displaceable toward and away from the second seat of the first valve body such that a cross section of a flow passage through the connection fitting can be varied by the flow-control valve.

2. The flow-control valve defined in claim 1, wherein the valve spindle with first valve body, the flow-control assembly with first valve subassembly and second valve subassembly together with the second valve body and the associated seats for the valve bodies are captively interconnected and together form a valve core as a single part that can be installed into or removed from the connection fitting of the housing as one piece.

3. The flow-control valve defined that claim 1, wherein the housing includes a valve core and the spindle has on its end projecting from the housing or the valve core, a handle for adjusting the second valve subassembly mounted on it in a non-rotational manner, the second valve body being coupled with the spindle via a screwthread and the second valve body being held or guided in a non-rotational manner on a component of the valve core or the first seat for the first valve body so as to be displaceable parallel to the longitudinal extension of the spindle.

4. The flow-control valve defined in claim 3, wherein the handle is detachably mounted on the spindle.

5. The flow-control valve defined in claim 1, wherein the handle is of polygonal shape and forms a drive formation for an adjustment tool.

6. The flow-control valve defined in claim 1, wherein the handle is provided with first markings for preset positions, and a second marking corresponding therewith is on the housing or on the valve core.

7. The flow-control valve defined in claim 1, wherein the pressure-control assembly has a diaphragm clamped in a chamber of the valve core whose face turned toward the actuating element of the spindle is in open communication with the inlet port via a first passage formed in the spindle and whose face turned away from the flow-control assembly communicates with the flow-control assembly via a second passage.

* * * * *